J. T. ALLMAND.
HANDLE ASSEMBLY.
APPLICATION FILED AUG. 31, 1917.
1,278,552.  Patented Sept. 10, 1918.
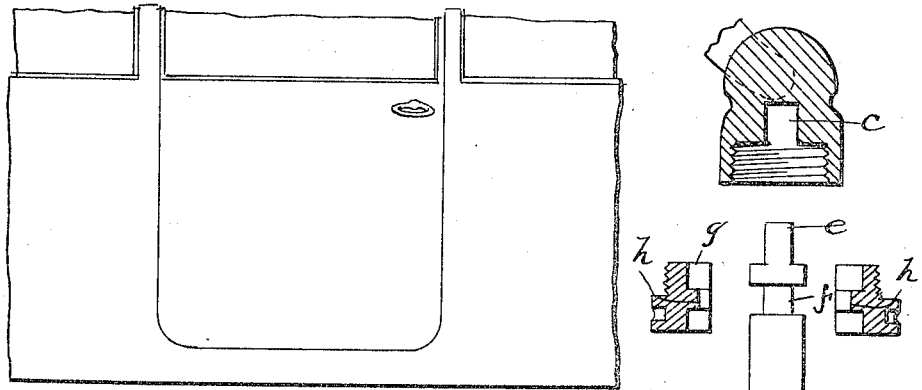
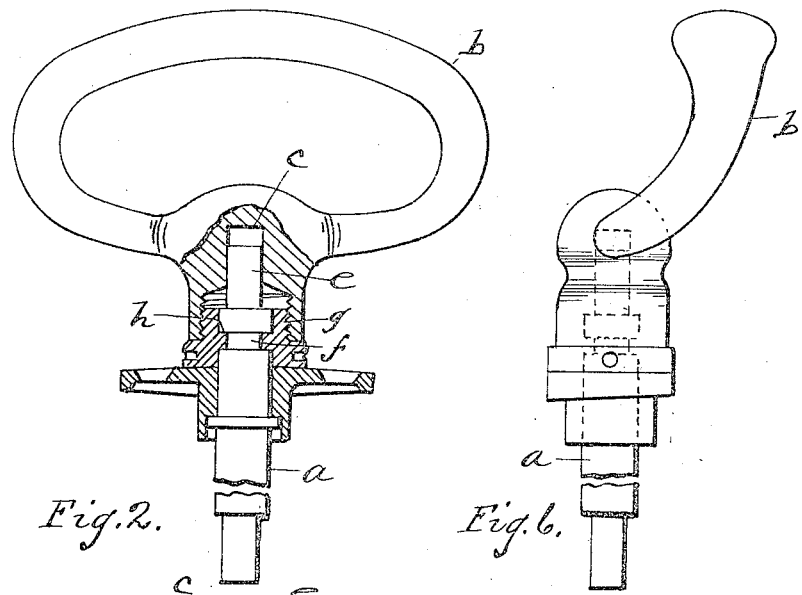
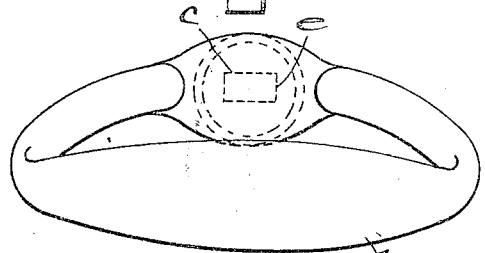
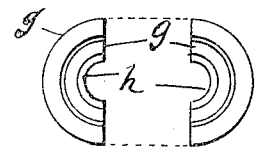
Inventor
John T. Allmand
By Ralzemond A. Parker
Attorney

UNITED STATES PATENT OFFICE.

JOHN T. ALLMAND, OF DETROIT, MICHIGAN.

HANDLE ASSEMBLY.

1,278,552.

Specification of Letters Patent. Patented Sept. 10, 1918.

Application filed August 31, 1917. Serial No. 189,097.

*To all whom it may concern:*

Be it known that I, JOHN T. ALLMAND, who am a citizen of the United States, residing at Detroit, county of Wayne, State of Michigan, have invented a certain new and useful Improvement in Handle Assemblies, and declare the following to be a full, clear, and exact description of the same, such as will enable others skilled in the art to which it pertains to make and use the same, reference being had to the accompanying drawings, which form a part of this specification.

This invention relates to a handle or crank lever assembly, the invention involving a new, neat and useful way of removably attaching a handle or crank to the end of a spindle or crank shaft.

A very common instance of the use of a metal handle on the end of a spindle is a door knob, especially an automobile door knob or crank handle on the window lifting device of a closed automobile. This is the special field in which this assembly is more particularly intended but it will be evident that its usefulness, broadly, is where an angular member is attached to the end of a shaft.

In the drawings,—

Figure 1 is a view of a closed automobile, fragmentary, but showing the handle attached to a door.

Fig. 2 is a side elevation partly in section of a handle attached to the end of a spindle.

Fig. 3 is an end elevation of the same.

Fig. 4 is a detail in section showing how the parts go together.

Fig. 5 is an end view of the spanner union nut.

Fig. 6 is an elevation taken at a 90° angle from that shown in Fig. 2.

*a* designates a spindle which may be used for a great many purposes, among others to move a latch of a door or operate a window-lifting apparatus in a closed automobile body. *b* is a handle, crank or other member having an angular relation to the spindle and intended to be removably secured to the end of the spindle. This handle or crank has a hub with a rectangular socket *e* and interiorly screw-threaded.

The spindle is formed into a rectangular nib *c*, which acts as a key and with an annular groove *f*.

The assembly is completed by a split or two-part spanner union nut *g* having two interior half-annular ribs *h* adapted to fit into the annular groove and form a complete annulus.

Now, obviously, when the two parts of the split union nut are brought together with the ribs in the annular groove, or against the shoulder formed by the groove, and the split nut turned until its threads take hold of the threads in the hub, the split union nut becomes as efficient as a one piece nut and serves to draw the handle tightly on to and serves to draw the handle tightly on to the spindle completing the assembly. Of course a single nut would not do because there is no way of assembling it upon the spindle to get the rib into the groove.

It will be noticed that the spindle *a* to the inside of the annular groove *f* is provided with an annular ring or escutcheon shoulder. The escutcheon can pass over the shoulder against which the split ring abuts but cannot pass over the escutcheon shoulder. Consequently when the escutcheon is screwed to the door this escutcheon shoulder prevents the spindle from being drawn out. When the split nut is in place it substantially abuts against the outside of the escutcheon and consequently prevents the spindle from being moved longitudinally in the other direction.

The complete assembly is shown in Fig. 6 and it will be evident that it makes a very neat and practical handle and it is hard to detect how the handle is put on because nothing but the spanner ring part of the nut is exposed.

The handle as a door handle for automobiles is a very distinct advance. The more common construction to-day consists of a spindle cast integral with the handle and carrying the escutcheon plate secured fast thereto. The spindle is held in the lock by securing the escutcheon plate to the door by screws. This results in the handle or spindle usually binding in the door and the handle having to be bent relatively to the spindle by hammering before the job is sent out. By my new way of assembly this trouble is completely overcome and yet the handle has a very similar appearance to the old construction.

What I claim is:

1. An assembly of the character specified, having in combination, a spindle having a shouldered portion, a hub alined with the spindle and provided with a screw-threaded interior, a nut split longitudinally into a plurality of parts having portions adapted to engage against the shouldered portion of the spindle, the spindle and the hub having such a relation that they will rotate together, the nut parts being tied together and the hub and spindle drawn together so as to be rotatably connected when the nut is assembled on the spindle engaging against the shouldered portion and turned into the threads of the hub.

2. In a crank handle assembly, the combination of a spindle provided with a shoulder and a key, a handle having a hub interiorly threaded and having a portion adapted to engage with the key to lock the hub and spindle in non-rotative relation, and an annular device provided with a split portion which can be fitted behind the shoulder, and a threaded portion for engaging with the threaded hub of the handle and operating in connection with the split portion to draw the handle onto the spindle and into non-rotative engagement therewith.

3. In a crank handle assembly, the combination of a spindle having on its end a rectangular nib and near the end a shoulder, a handle having a hub interiorly threaded and provided also with a rectangular socket, and a split nut which can be assembled around the spindle and behind the shoulder to engage with the threads of the hub and draw the handle onto the spindle and into non-rotative engagement therewith by reason of the nib engaging in the socket.

4. In a door handle assembly, the combination of a spindle provided near its outer end with a shoulder and provided farther in with an escutcheon shoulder of larger radius, an escutcheon which can be slipped over the smaller shoulder and engage against the escutcheon shoulder to hold the spindle from movement longitudinally in one direction, a handle with an interiorly threaded hub, and an annular member having a split portion and a threaded portion, the former portion engaging with the shoulder and the latter portion with the hub threads to draw the handle onto the spindle in non-rotatable relation therewith, the said annular member abutting against the escutcheon to prevent any substantial longitudinal movement of the spindle in the other direction.

In testimony whereof I sign this specification.

JOHN T. ALLMAND.